Patented Feb. 4, 1930

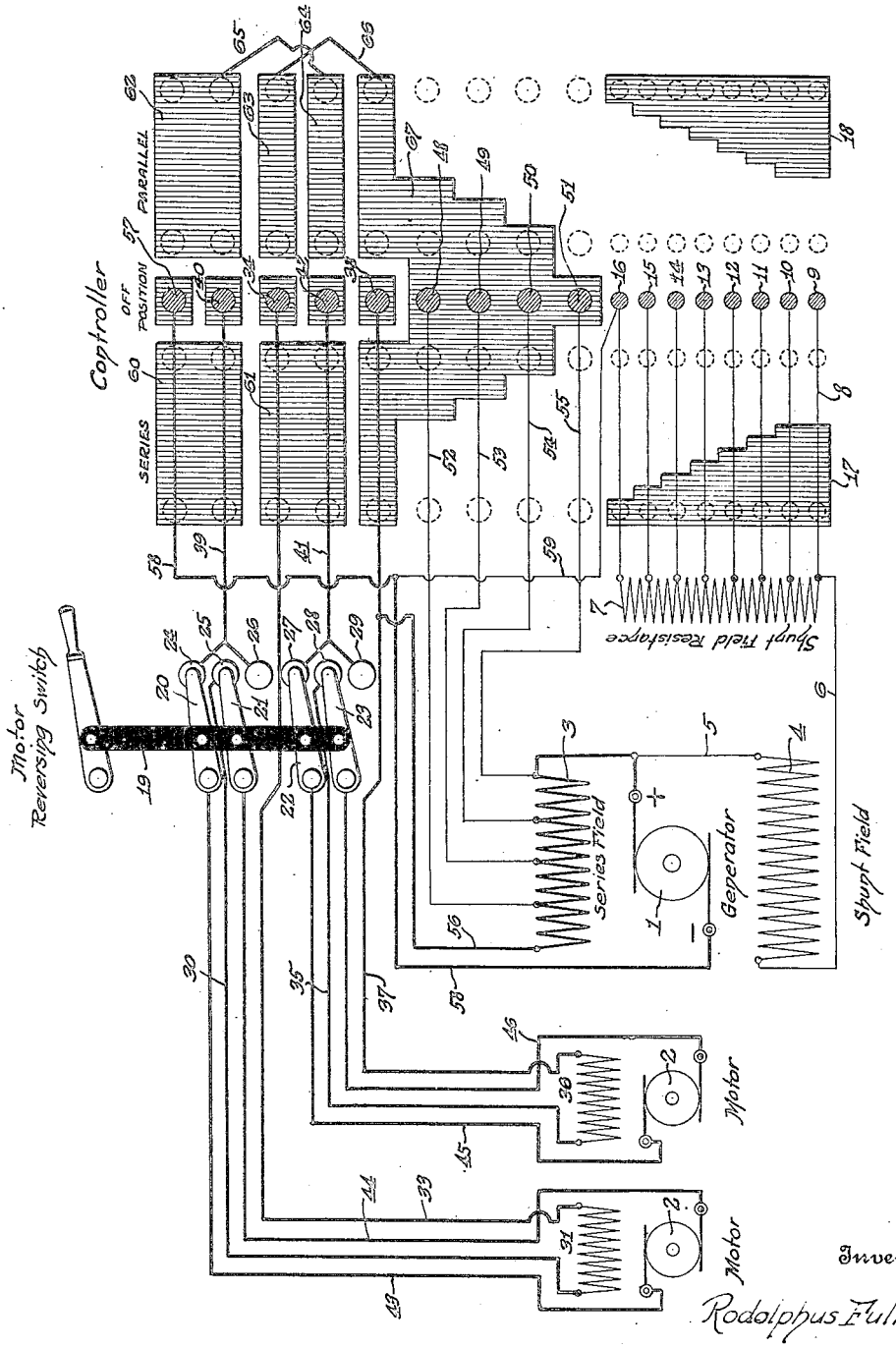

1,745,532

UNITED STATES PATENT OFFICE

RODOLPHUS FULLER, OF DETROIT, MICHIGAN

ELECTRIC MOTOR CONTROL

Application filed June 21, 1926. Serial No. 117,328.

This invention relates to a system of electric motor control and is an improvement on the disclosure in my Patent No. 994,993, granted June 13, 1911. In this patent there is a motor control capable of general application in electric power transmission mechanism where great flexibility is required in starting and stopping with heavy loads and it is particularly applicable to the control of electric power busses and the like designed for transporting heavy loads and which are driven by electric power generated on the vehicle itself and the power transmitted to the wheels of the vehicle or through independent motors in suitable driving connection therefor.

In this type of electric drive a generator is driven by an internal combustion engine or other prime mover and the generator is adapted to operate motors at various power output. A controller is employed to increase or decrease the E. M. F. of the generator with each connection in a manner to produce the highest efficiency of the motors in stopping, starting or accelerating the vehicle. The controller employed was of the progressive type permitting changing the motor connections from series to series-parallel to parallel in starting. In changing the connections in this sequence there is a drop from the maximum voltage in one connection to zero volts in the next connection. In the reverse order, for stopping, the voltage abruptly mounts from zero on one connection to the maximum on the next connection, with the attendant danger of jerking the vehicle ahead when slow movement is wanted. Such operation is inducive to accidents in congested districts.

My improvement aims, in connection with the controller, to necessitate movement of the controller in opposite directions in order to operate a vehicle with the motors connected in different electrical connections. In such an operation it is necessary to bring the controller to a neutral position. For instance, an operator by movement of the controller in a desired direction also starts the motors from zero volts to maximum E. M. F. and returns to zero volts position, before changing to a different connection of the motors. Thus in passing a current to the electric motors, the current starts at zero volts to maximum E. M. F. and returns to zero volts before any other connection can be made. For example, an electrically driven bus which has been accelerated does not pick up the load until there is an impressed E. M. F. Consequently electrical connections are not subjected to a sudden change in voltage whereby there could be any arcing or blow-outs.

My invention will be hereinafter more fully described in connection with the accompanying drawing which shows a diagrammatic view of the electrical connections for generator driven motors in connection with a controller adapted for series and parallel circuits.

In the drawing, the reference numeral 1 denotes a conventional form of electric generator which may be driven from an internal combustion engine or any other suitable source of power.

2 denotes electric motors adapted to be operated from a generator 1 and these electric motors may have any suitable driving connection with the wheels of a vehicle. Two motors have been shown for individually driving the rear wheels of a vehicle, and obviously a single or additional motors may be used for a four-wheel or other multi-wheel drive.

3 denotes a series field having a multiplicity of takeoff connections or leading-out wires 52, 53, 54 and 55, and 4 a shunt field, these fields being electrically connected, as at 5, to one side of the generator. The shunt field is electrically connected, as at 6, to a shunt field resistance 7 having a multiplicity of take off connections 8 with a series of stationary contacts 9 to 16 inclusive forming part of the stator of a controller. These stationary contacts 9 to 16 inclusive are adapted to be engaged by stepped contact members 17 and 18 forming part of the control element or rotor of the controller.

19 denotes a motor reversing switch having connected throw arms 20, 21, 22 and 23 adapted to engage contacts 24 to 29 inclusive. The contact 25 is connected by a wire 30 to the field 31 of one of the motors 2 and said field is connected by a wire 33 to a stationary contact 34 of the controller. The contact 28 is connected by a wire 35 to the field 36 of the other motor and said field connected by a wire 37 to another stationary contact 38 of the controller. The contacts 24 and 26 are connected by a wire 39 to a stationary contact 40 of the controller, and the contacts 27 and 29 are connected by a wire 41 to a stationary contact 42 of the controller. The throw arm 20 of the reversing switch is connected by a wire 43 to one of the motors 2 and the same motor is connected by a wire 44 to the throw arm 21. The throw arm 22 is connected by a wire 45 to the other motor 2 and the same motor connected by a wire 46 to the throw arm 23.

48 to 51 inclusive denotes stationary contacts of the controller which are connected by wires 52 to 55 inclusive with the series field 3 and said series field has an end connection 56 with the wire 37.

57 is another stationary contact of the controller which is connected by a wire 58 to the generator and by a wire 59 to the stationary contact 16 of the controller.

60 and 61 denote series of control contact members and 62, 63 and 64 parallel control contact members of the controller, these contact members 60 to 64 inclusive being movable relative to the contacts 57, 40, 34 and 42. The parallel contact members 62 and 64 are connected by a wire 65 and the parallel contact member 63 is connected by a wire 66 to a stepped movable contact member 67 normally serving the stationary contacts 48 to 51 inclusive, and adapted to serve the stationary contact 38 of the controller.

By considering the arrangement of the series and parallel contacts, which are movable relative to the stationary contacts of the controller and adapted to engage said stationary contacts, it will be noted that the controller can be operated, either to the "right" or to the "left" to place one or the other of the series or parallel contacts in circuit, but before switching from parallel to series it is necessary to bring the controller to an "off" or neutral position. It is by virtue of this "off" position that the motors 2 are always started from zero volts to maximum E. M. F. and return to zero volts position before changing to a different connection of the motors. As an instance of one of the circuits, I will assume that the controller is shifted from an "off" position so that the series contact members 60 and 61 are brought into engagement with the stationary contact members 57, 40, 34 and 42. Starting with the negative side of the generator 1, the circuit is by wire 58 to contacts 57 and 40 by contact members 60 to wire 39, contact 24 and wire 43 to one side of the motor 2. From the other side of the motor by wire 44 to contact 25 and return by wire 30 to the field 31. Then by wire 33 through to contacts 34 and 42, which being bridged by contact member 61 continues by wire 41 to contact 27, wire 45 to the other motor 2. From this motor by wire 46 to contact 28, wire 35 to field 36, wires 37 and 56 to series field 3 and to the positive side of the generator.

It will be noted that when the controller is swung to the series side that the contacts 48 to 51 are gradually disconnected from each other by the contact member 67 and when this is completed the contacts 9 to 16 inclusive are progressively engaged by the contact members 17, thus cutting out of circuit the shunt field resistance 7 after the series field 3 is placed in full circuit.

It is thought unnecessary to trace any of the circuits for the parallel side of the controller, and obviously the motor reversing switch will be understood for reversing the motors 2 for vehicle backing purposes.

I attach considerable importance to the fact that in connection with all circuits it is necessary to reduce the generated voltage to a minimum and come back to a no voltage position of the controller before there can be any change in the operation or electrical connections to the motors, after which the new connection is initiated at its minimum voltage.

What I claim is:—

1. In combination with a generator having a variable winding controlling the electromotive force of the generator, take-off connections leading from said winding, a controller comprising mutually insulated contacts attached to said connections, and a relatively movable contact member adapted to progressively link said contacts together and unlink them, said movable contact member having a progressive linking formation at each end thereof, a set of motor contacts, two spaced sets of relatively movable contact members adapted to engage said motor contacts for different motor connections from said generator, said motor contacts being receivable between said latter sets of relatively movable contact members to provide a no-voltage position, the space between said sets of relatively movable contact members being disposed between said progressive linking formations, each formation having its minimum voltage positioned at the end nearer said space and having its higher voltage positions increasing progressively away from said end, whereby shifting from a given connection to the other connection is accomplished by successively bringing said given connection to its minimum voltage position, locating the no-voltage position and coming into the other connection at its minimum voltage position.

2. In combination with a generator having a series field winding, a shunt field, and a shunt field resistance, take-off connections leading from said series field winding and shunt field resistance, a controller comprising mutually insulated series field and shunt resistance contacts attached to the take-off connections from said series field and shunt field resistance respectively, a relatively movable contact member adapted to progressively link the series field contacts together and unlink them, said movable contact member having a progressive linking formation at each end thereof, a set of motor contacts, two spaced sets of relatively movable contact members adapted to engage said motor contacts for different motor connections from said generator, said motor contacts being receivable between said latter sets of relatively moveable contact members to provide a no-voltage position, the space between said sets of relatively movable contact members being disposed between said progressive linking formations, each formation having its minimum voltage positioned at the end nearer said space and having its higher voltage positions increasing progressively away from said end, whereby shifting from a given connection to the other connection is accomplished by successively bringing said given connection to its minimum voltage position, locating the no-voltage position, and coming into the other connection at its minimum voltage position; said controller further including a pair of stepped contact members movable relatively to said shunt field resistance contacts, said members being disposed at the maximum voltage ends of said progressive formations and adapted to link said shunt field resistance contacts together after said series field contacts have been unlinked.

In testimony whereof I affix my signature.

RODOLPHUS FULLER.